United States Patent
Datta et al.

(10) Patent No.: US 12,514,530 B2
(45) Date of Patent: Jan. 6, 2026

(54) SYSTEMS AND METHODS FOR IMAGE ARTIFACT MITIGATION WITH TARGETED MODULAR CALIBRATION

(71) Applicant: GE Precision Healthcare LLC, Wauwatosa, WI (US)

(72) Inventors: Arka Datta, Pewaukee, WI (US); John M Boudry, Waukesha, WI (US); Zhoubo Li, Doylestown, PA (US); Adam Cohen, Waukesha, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 914 days.

(21) Appl. No.: 17/658,900

(22) Filed: Apr. 12, 2022

(65) Prior Publication Data

US 2023/0320688 A1 Oct. 12, 2023

(51) Int. Cl.
*A61B 6/58* (2024.01)
*A61B 6/03* (2006.01)
*G06T 7/00* (2017.01)

(52) U.S. Cl.
CPC .............. *A61B 6/583* (2013.01); *A61B 6/032* (2013.01); *G06T 7/0002* (2013.01); *G06T 2207/10081* (2013.01); *G06T 2207/20084* (2013.01); *G06T 2207/30004* (2013.01); *G06T 2207/30168* (2013.01)

(58) Field of Classification Search
CPC .... A61B 2560/0223; A61B 2560/0228; A61B 2560/0238
See application file for complete search history.

(56) References Cited

U.S. PATENT DOCUMENTS

| | | | |
|---|---|---|---|
| 7,012,986 B1 | 3/2006 | Chao et al. | |
| 8,121,250 B2 | 2/2012 | Dafni et al. | |
| 8,520,920 B2 | 8/2013 | Guehring et al. | |
| 8,831,319 B2 | 9/2014 | Dafni et al. | |
| 9,020,092 B2 | 4/2015 | Wang et al. | |
| 2007/0122020 A1* | 5/2007 | Claus | G06T 11/005 382/131 |
| 2011/0116697 A1 | 5/2011 | Dafni et al. | |
| 2011/0135179 A1* | 6/2011 | Ross | A61B 6/583 382/131 |
| 2014/0014828 A1* | 1/2014 | Bredno | A61B 6/5205 250/252.1 |
| 2017/0296132 A1* | 10/2017 | Manak | A61B 6/585 |
| 2021/0183055 A1* | 6/2021 | Rao | G06T 7/0012 |
| 2022/0296202 A1* | 9/2022 | Zhan | A61B 6/4241 |
| 2022/0323029 A1* | 10/2022 | Hartley | A61B 6/032 |

* cited by examiner

*Primary Examiner* — Wen W Huang
(74) *Attorney, Agent, or Firm* — McCoy Russell LLP

(57) ABSTRACT

Methods and systems are provided for calibrating a medical imaging system. In one example, a method includes identifying a calibration vector to be updated based on an artifact in an image acquired with the medical imaging system, determining calibration data to be obtained with the medical imaging system based on the calibration vector, obtaining the calibration data with the medical imaging system, and updating the calibration vector based on the calibration data.

20 Claims, 10 Drawing Sheets

SYSTEMS AND METHODS FOR IMAGE ARTIFACT MITIGATION WITH TARGETED MODULAR CALIBRATION

TECHNICAL FIELD

Embodiments of the subject matter disclosed herein relate to imaging, and more particularly, to systems and methods for reducing image artifacts in medical images via targeted system calibration.

BACKGROUND

Non-invasive imaging technologies allow images of the internal structures of a patient or object to be obtained without performing an invasive procedure on the patient or object. In particular, technologies such as computed tomography (CT) use various physical principles, such as the differential transmission of x-rays through the target volume, to acquire image data and to construct tomographic images (e.g., three-dimensional (3D) representations of the interior of the human body or of other imaged structures).

In computed tomography (CT), an x-ray source and an x-ray detector are arranged on opposite sides of a gantry encircling a body of the patient lying on a table, and a cross-sectional image (e.g., slice) of a region of interest (ROI) is reconstructed from x-ray data (e.g., projections) acquired from the body as the x-ray source and the x-ray detector rotate around the body. A position of the table of the gantry may be adjusted in a superior/inferior (SI) direction (e.g., a z-direction) along a central axis of the gantry over time to generate a plurality of slices from which one or more images may be generated. The table may be continuously adjusted in real time, where projections are acquired as the x-ray source follows a trajectory of a spiral or a helix around the patient. The images reconstructed from the slices may be combined to create a 3D volumetric image of the ROI.

SUMMARY

A method is disclosed herein for calibrating a medical imaging system, comprising identifying a calibration vector to be updated based on an artifact in an image acquired with the medical imaging system, determining calibration data to be obtained with the medical imaging system based on the calibration vector, obtaining the calibration data with the medical imaging system, and updating the calibration vector based on the calibration data.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
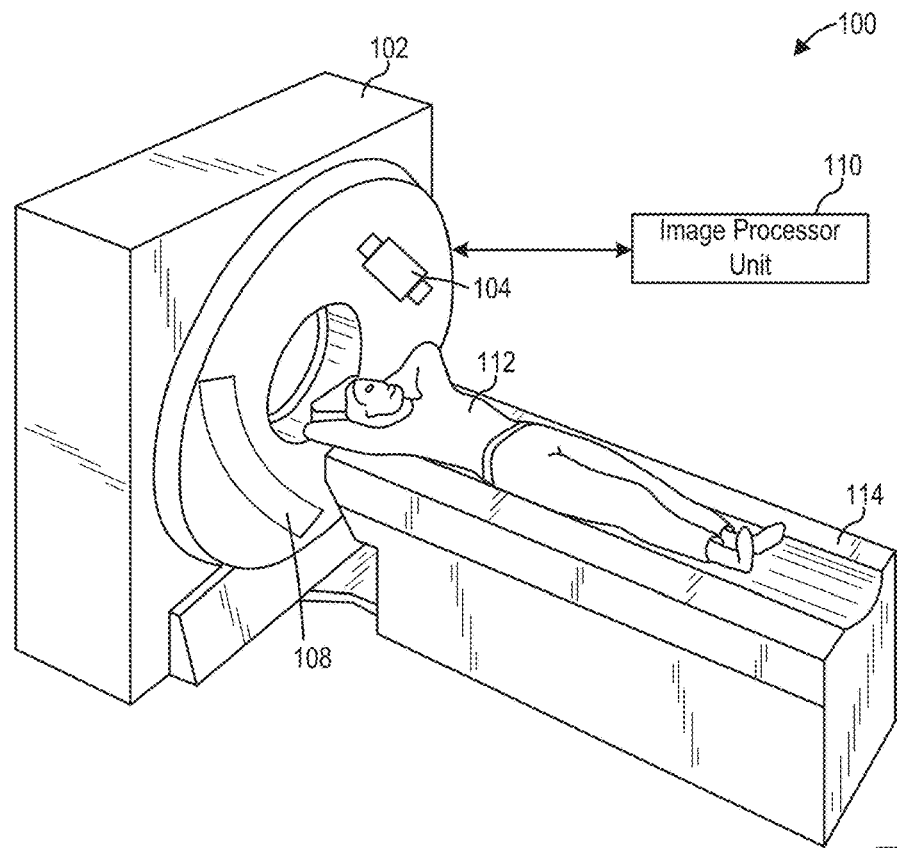
FIG. 1 shows a pictorial view of an imaging system, according to an embodiment.

This description and embodiments of the subject matter disclosed herein relate to the identification and adjustment of one or more calibration vectors (herein also referred to as "vectors"). Calibration vectors, as described herein, are mathematical quantities which represent physical and electronic characteristics specific to a particular imaging system (e.g., representing "system physics"). Calibration vectors, as described herein, are numerical or mathematical quantities stored within digital memory of a computing device, or in memory accessible to a computing device. Digital representation of calibration vectors in memory may comprise floating point numbers, integer numbers, arrays with one or more index, lookup tables (LUTs), complex numbers, matrices, or virtually any other format.

Imaging via CT or other modalities is performed via an imaging system. The imaging system may be made of a large variety of different constituent parts, each of which may be manufactured within different manufacturing tolerances. Mechanical and electrical differences between imaging systems may lead to artifacts in medical images caused by a mismatch between the expected properties of the imaging system and the actual properties of the imaging system. To correct for these non-ideal behaviors, the imaging system may include a set of calibration data, represented in the form of calibration vectors, which are usable to correct for the non-ideal behavior. Thus, calibration vectors may be stored within a given imaging system to account for manufacturing tolerances or other differences that may be present from imaging system to imaging system. Calibration vectors therefore allow for mechanical and electrical differences resulting from manufacturing of different imaging systems to be accounted for and corrected for. For example, the sensitivity of individual detectors within an imaging system may be encoded through one or more calibration vectors stored within an imaging system.

Imaging systems, including CT imaging systems, create images through the use of scan data. The scan data may represent the raw data obtained by the imaging system, usable to reconstruct a medical image. During image reconstruction the calibration vectors may be used as input. For example, if the output of each x-ray detector is known in a CT imaging system, deviations between the outputs of each x-ray detector may be corrected by modifying the raw values obtained from the detectors according to one or more calibration vectors.

Obtaining calibration data may be accomplished through performing calibration scans. Performing a calibration scan involves scanning a known object (e.g., a phantom, which has a standardized size and radiodensity) and using the scan data to account for the non-ideal behavior. The scan data may be adjusted such that the image, as corrected through the use of the calibration data, is free of artifacts. For example, if a phantom of uniform (and known) radiodensity is scanned using a CT imaging system, the calibration vectors associated with each of the x-ray detectors may be adjusted such that in an image reconstructed from the scan data, the radiodensity measured at each point is equal to that known value. If the raw values output by each of the x-ray detectors are used instead of the calibrated ones, artifacts may become visible in the reconstructed image. In this example, the artifacts may materialize as fixed locations in the scan with higher- or lower-than-normal radiodensity.

Continued use of any imaging system may lead to ordinary physical wear, which may be further corrected with routine maintenance. Electronic components are also susceptible to wear. In a CT system, for example, a number of x-ray detectors may be used to detect x-rays emitted by one or more x-ray sources. Over time, x-ray detectors may lose sensitivity (e.g., "drift") due to repeated exposure to ionizing radiation, and the x-ray sources may gradually fade in intensity (e.g., "burn out") or become subject to changing x-ray spectrum emissions over time.

As the imaging system is consistently used to acquire medical images, several system parameters (e.g., detector performance, tube output, motor performance, etc.) may drift over time, rendering the stored calibration data inaccurate. However, artifacts may not appear in every medical image acquired with the medical device; the artifacts may only appear when performing scans according to certain scan protocols. For example, artifacts associated with a high peak kilovoltage (kVp) protocol scan may not appear in a low-kVp scan. In general, each scan protocol may not be informed by all calibration vectors associated with the imaging system.

In addition to the example given above, medical images have the potential to be affected by a large multitude of other imaging artifacts. For CT imaging systems, these include, but are not limited to, beam hardening effects, motion artifacts, x-ray source burn out artifacts, and more. To correct for a large multitude of possible artifacts, a detailed calibration (e.g., a calibration to adjust all calibration vectors) of the imaging system may be performed. The detailed calibration process may be conducted, for example, if the imaging system is being set up for first use or after one or more significant hardware changes (e.g., the replacement of a part of the imaging system due to wear). Unfortunately, the detailed calibration process may incur significant down time of the imaging system, during which it cannot be used for the purpose of medical imaging. Detailed calibration, which is used to adjust all calibration vectors, may involve the scanning of several phantoms, manual clinician input to adjust the quality of the calibration images, and more.

Thus, according to the embodiments described herein, only a portion of the calibration vectors may be updated, according to a calibration procedure of a more limited scope. The calibration vectors to be updated may be determined through the qualitative and quantitative analysis of one or more images, both from calibration scan images and from medical images. The identified calibration vectors may be used to inform a calibration scan protocol specifically designed to update calibration vectors correlated with the imaging artifacts observed in the medical images and/or calibration images. Calibration vectors uncorrelated with the imaging artifacts are not updated. Thus, according to this modular approach, significantly fewer calibration vectors may be updated (compared to a detailed calibration process), which reduces the down time of the imaging system. With a shorter downtime incurred by the modular calibration, these modular calibrations may be performed more frequently, which may increase the accuracy of subsequent medical images through the targeted reduction of imaging artifacts.

Though a CT system is described by way of example, it should be understood that the present techniques may also be useful when applied to images acquired using other imaging modalities, such as tomosynthesis, positron emission tomography (PET) imaging, C-arm angiography, and so forth. The present discussion of a CT imaging modality is provided merely as an example of one suitable imaging modality.

FIG. 1 illustrates an exemplary CT system 100 configured for CT imaging. Particularly, the CT system 100 is configured to image a subject 112 such as a patient, an inanimate object, a calibration phantom, one or more manufactured parts, and/or foreign objects such as dental implants, stents, and/or contrast agents present within the body. In one embodiment, the CT system 100 includes a gantry 102, which in turn, may further include at least one x-ray source 104 configured to project a beam of x-ray radiation 106 (see FIG. 2) for use in imaging the subject 112 laying on a table 114. Specifically, the x-ray source 104 is configured to project the x-ray radiation beams 106 towards a detector array 108 positioned on the opposite side of the gantry 102. Although FIG. 1 depicts a single x-ray source 104, in certain embodiments, multiple x-ray sources and detectors may be employed to project a plurality of x-ray radiation beams for acquiring projection data at different energy levels corresponding to the patient. In some embodiments, the x-ray source 104 may enable dual-energy gemstone spectral imaging (GSI) by rapid peak kVp switching. In some embodiments, the x-ray detector employed is a photon-counting detector which is capable of differentiating x-ray photons of different energies. In other embodiments, two sets of x-ray sources and detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both the scan data obtained by the CT image and one or more calibration vectors to reconstruct the medical images.

In some CT imaging system configurations, an x-ray source projects a cone-shaped x-ray radiation beam which is collimated to lie within an X-Y-Z plane of a Cartesian coordinate system and generally referred to as an "imaging plane." The x-ray radiation beam passes through an object being imaged, such as the patient or subject. The x-ray radiation beam, after being attenuated by the object, impinges upon an array of detector elements. The intensity of the attenuated x-ray radiation beam received at the detector array is dependent upon the attenuation of an x-ray radiation beam by the object. Each detector element of the array produces a separate electrical signal that is a measurement of the x-ray beam attenuation at the detector location. The attenuation measurements from all the detector elements are acquired separately to produce a transmission profile.

In some CT systems, the x-ray source and the detector array are rotated with a gantry within the imaging plane and around the object to be imaged such that an angle at which the x-ray beam intersects the object constantly changes. A group of x-ray radiation attenuation measurements, e.g., projection data, from the detector array at one gantry angle is referred to as a "view." A "scan" of the object includes a set of views made at different gantry angles, or view angles, during one revolution of the x-ray source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, positron emission tomography (PET), or single-photon emission CT (SPECT) acquisition, and/or any other modality including modalities yet to be developed as well as combinations thereof in fused embodiments.

The projection data is processed to reconstruct an image that corresponds to a two-dimensional slice taken through the object or, in some examples where the projection data includes multiple views or scans, a three-dimensional image of the object. One method for reconstructing an image from a set of projection data is referred to in the art as the filtered back projection (FBP) technique. Transmission and emission tomography reconstruction techniques also include statistical iterative methods such as maximum likelihood expectation maximization (MLEM) and ordered-subsets expectation-reconstruction techniques as well as iterative reconstruction techniques. This process converts the attenuation measurements from a scan into integers called "CT numbers" or "Hounsfield units," which are used to control the brightness of a corresponding pixel on a display device.

To reduce the total scan time, a helical scan may be performed. To perform a helical scan, the table supporting the patient is moved relative to the gantry while the data for the prescribed number of slices is acquired. Such a system generates a single helix from a cone beam helical scan. The helix mapped out by the cone beam yields projection data from which images in each prescribed slice may be reconstructed.

As used herein, the phrase "reconstructing an image" is not intended to exclude embodiments in which data representing an image is generated but a viewable image is not. Therefore, as used herein, the term "image" broadly refers to both viewable images and data representing a viewable image. However, many embodiments generate (or are configured to generate) at least one viewable image.

Figure 2:
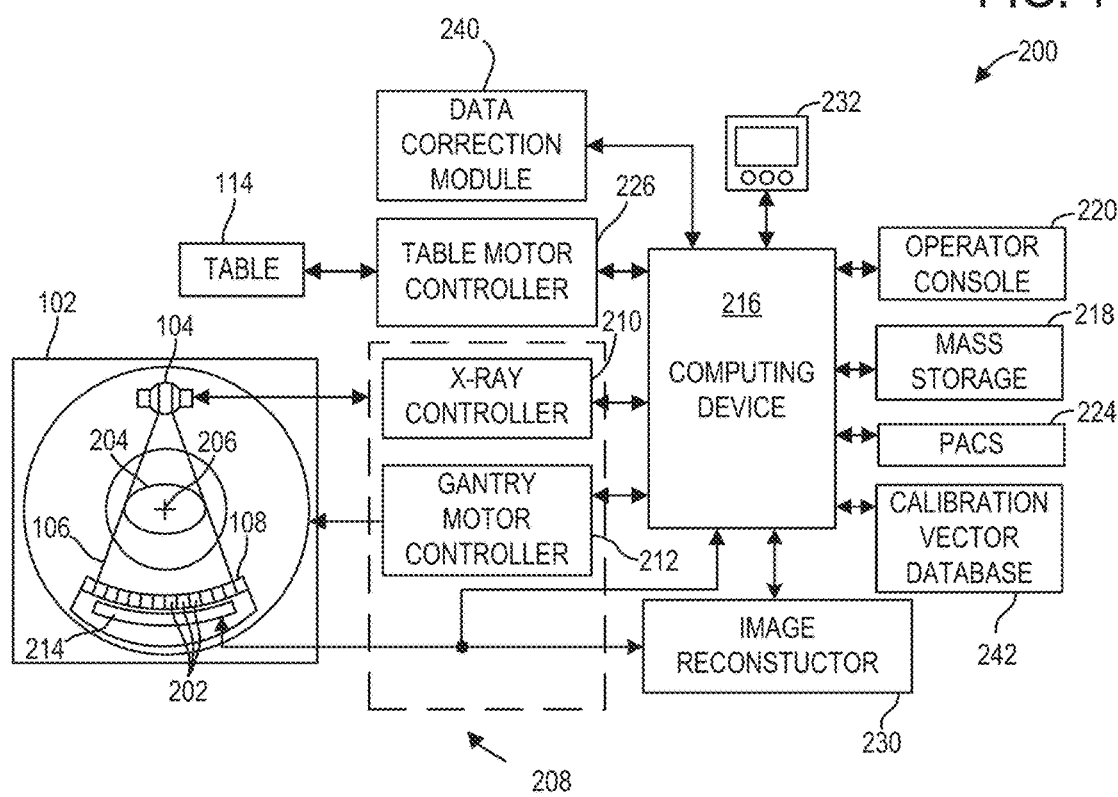
FIG. 2 shows a block schematic diagram of an exemplary imaging system, according to an embodiment.

FIG. 2 illustrates an exemplary imaging system 200 similar to the CT system 100 of FIG. 1. In accordance with aspects of the present disclosure, the imaging system 200 is configured for imaging a subject 204 (e.g., the subject 112 of FIG. 1). In one embodiment, the imaging system 200 includes the detector array 108 (see FIG. 1). The detector array 108 further includes a plurality of detector elements 202 that together sense the x-ray radiation beam 106 (see FIG. 2) that pass through the subject 204 (such as a patient) to acquire corresponding projection data. Accordingly, in one embodiment, the detector array 108 is fabricated in a multi-slice configuration including the plurality of rows of cells or detector elements 202. In such a configuration (e.g., multi-row detector CT or MDCT), one or more additional rows of the detector elements 202 are arranged in a parallel configuration for acquiring the projection data. The configuration may include 4, 8, 16, 32, 64, 128, or 256 detector rows. For example, a 64-slice MDCT scanner may have 64 detector rows with a collimator width of 4 cm, while a 256-slice MDCT scanner may have 256 detector rows with a collimator width of 16 cm. Thus, four rotations of a helical scan performed with the 64-slice MDCT scanner may achieve a detector coverage equivalent to a single rotation of scan performed with the 256-slice MDCT scanner.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a 3D volumetric image of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. In one example, the computing device 216 stores the data in a storage device or mass storage 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

The computing device 216 is further coupled to a data correction module 240, which is configured to adjust the quality of medical and calibration images through the use of calibration data. The data correction module 240 is further configured to identify image artifacts, identify calibration vectors correlated with the identified artifacts, and generate calibration scan data usable to correct the identified image artifacts. Data correction module 240 may be integrated within the computing device 216, and may use the memory and processing resources thereon to perform the image correction and calibration procedures. To identify artifacts within images, data correction module 240 may include a qualitative image artifact identification model, which may comprise a model trained through a machine learning process. To translate artifacts identified by the qualitative image artifact identification model, the data correction module 240 may further include an artifact LUT and/or a calibration vector identification model, both of which are usable to take as input a given artifact and return one or more calibration vectors associated with that artifact. Updated calibration vectors are further used to perform corrections in medical images, allowing for increased accuracy of medical images.

To source the calibration vectors usable to perform image correction, the computing device 216 is further coupled to a calibration vector database 242, which may comprise a database internal or external to the computing device 216, configured to store all calibration data associated with the imaging system. The calibration vector database 242 may take commands from the computing device 216 to retrieve and/or modify the calibration vectors to adjust the quality of both calibration images and medical images. In some examples, some calibration vectors are computed directly from others. If a first calibration vector is calculated from a collection of other vectors, the first calibration vector is called a dependent vector (and is said to depend on the other vectors). In order to record the dependence of each vector on the other vectors, the calibration vector database 242 may include a table of dependent vectors. In some examples, this may comprise a lookup table (LUT). The calibration vector database 242 may further include an artifact LUT which takes as input an image artifact and returns one or more calibration vectors as output. The calibration vectors returned as output are calibration vectors correlated with the image artifact, e.g., calibration vectors whose values affect a presence and/or intensity of the image artifact.

Although FIG. 2 illustrates one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

Figure 3:
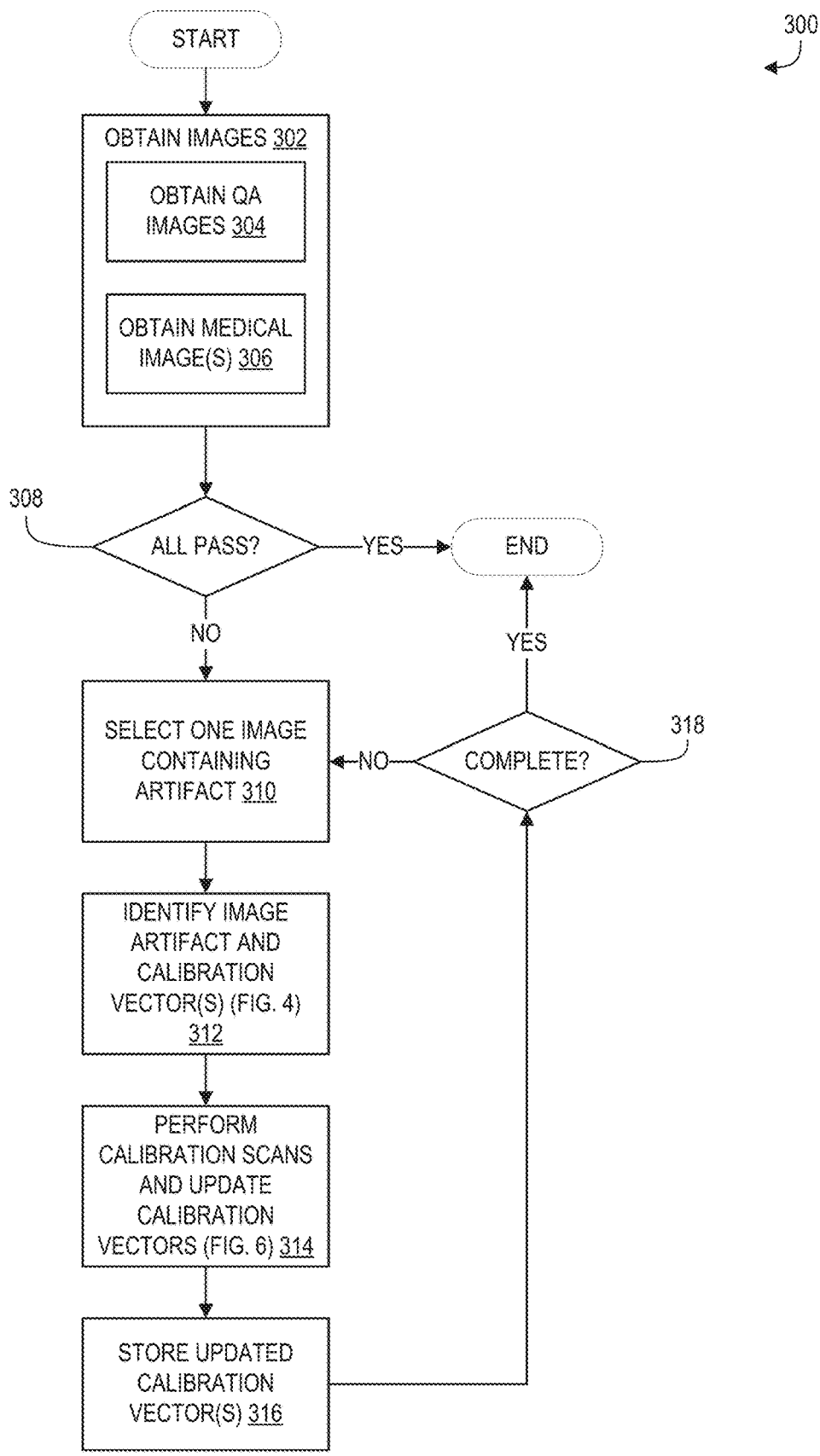
FIG. 3 shows a diagram of a method to perform modular calibration.

If the subject 112 is moving relative to the intended trajectory of the table during the scan, artifacts may be produced in the reconstructed image, an example of which is shown in FIG. 3. For example, horizontal streaks may be produced in the image, possibly obscuring important bodily features within the scan. In order to alert the operator (and possibly correct for the defects with image processing), the temporal inconsistencies can be detected and corrected via the method shown in FIG. 4 and explained in more detail below. The operator may be notified by a suitable mechanism, including, for example, a message box displayed on the display device 232.

FIG. 3 shows a method 300 to perform a modular calibration of an imaging system based on a plurality of medical images and/or calibration images obtained with the imaging system. Method 300 may be represented by a sequence of machine-executable instructions, which may be stored within the data correction module 240 and executable through the use of one or more processor(s), such as the processor(s) of computing device 216. Method 300 is usable to adjust, update, and/or retrieve calibration vectors, which may be stored in a calibration vector database 242.

At 302, method 300 includes obtaining images. Obtaining images may include, as indicated at 304, obtaining quality assurance (QA) images and/or may include, as indicated at 306, obtaining medical images. Quality assurance scans may be performed by imaging one or more phantoms, such as, for example, cylindrically-shaped distilled water bins or other suitable structures with known geometry and radiodensity. The QA images may be acquired according to a variety of different imaging protocols in order to confirm existing calibration data is still applicable and/or generate data usable to calibrate various aspects of the imaging system, including speed calibration, detector calibration, and beam hardening calibration. The medical images may include images of one or more patients acquired as part of one or more medical scans carried out to diagnose or rule out patient conditions, for example.

At 308, method 300 includes determining if all of the obtained images pass a quality assurance check. The quality assurance check may comprise, for example, computing one or more quantitative image quality metrics for each image and/or by checking for the presence of artifacts in each image through inputting the images into, for example, a qualitative image artifact analysis model. Further detail on the identification of image artifacts is given with respect to FIG. 4. If each image passes the quality assurance check, method 300 ends without updating the calibration data. Otherwise, the images not passing the QA check may be identified as a collection of images containing artifacts, and method 300 proceeds to 310.

At 310, method 300 includes selecting one image containing an artifact. This image may be selected from the collection of images containing artifacts identified at 308. In some cases, the image selected at 310 may contain more than one artifact.

At 312, method 300 includes identifying an image artifact and one or more calibration vectors. Identifying the image artifact and one or more associated calibration vectors comprises analyzing the image selected at 310 through quantitative and qualitative measures usable to identify one or more image artifacts and mapping those artifacts to one or more identified calibration vectors. In some examples, a qualitative image artifact analysis model, which comprises a machine learning model, e.g., a deep neural network model, a convolutional neural network (CNN), or other trained model, may be deployed to identify the image artifact(s) in the image. As explained in further detail with respect to FIG. 5, the qualitative image artifact analysis model may be trained using a plurality of images with identified artifacts. The trained model may be configured to generate a list of artifacts, which may then be input into a calibration vector LUT and/or a calibration vector model to identify one or more calibration vectors to be adjusted. Additional details on the identification of the image artifacts and the calibration vectors are given with respect to method 400 of FIG. 4.

At 314, method 300 includes performing calibration scans and updating calibration vectors. The calibration vectors identified at 312 may be used to generate one or more scanning protocols, and one or more calibration scans may be performed according to those scanning protocols. Each calibration scan may generate calibration scan data usable to generate one or more updated calibration vectors. Since some calibration vectors may directly depend on other calibration vectors, performing the scanning protocols may include updating one or more independent vectors and updating vectors which depend on the independent vectors. In some cases, previous values of some of the independent vectors may be used instead of independent calibration vectors calculated through the calibration scan data. Further detail of the calibration vector updating process is explained in further detail with respect to FIG. 6.

At 316, method 300 includes storing the updated calibration vectors. The calibration vectors may be stored in, for example, the calibration vector database for use in further image acquisition.

At 318, method 300 includes determining if the calibration procedure is complete. The calibration process is determined to be complete if all calibration vectors associated with the identified image artifacts have been analyzed and each calibration vector has been updated. If yes, method 300 ends, having stored the updated calibration vectors at 316. Otherwise, method 300 proceeds to 310, where a different image containing an artifact is selected and the remaining process is performed on the different image (e.g., the artifacts in the image are identified and mapped to one or more calibration vectors that may be updated with one or calibration scan images). The calibration vectors updated via method 300 is further usable to perform medical scans of a patient with the medical imaging system to generate one or more medical images of the patient, such that the medical scan is carried out using the updated calibration vectors. Medical images performed with the updated calibration vectors may therefore include fewer artifacts, e.g., may be more accurate.

Figure 4:
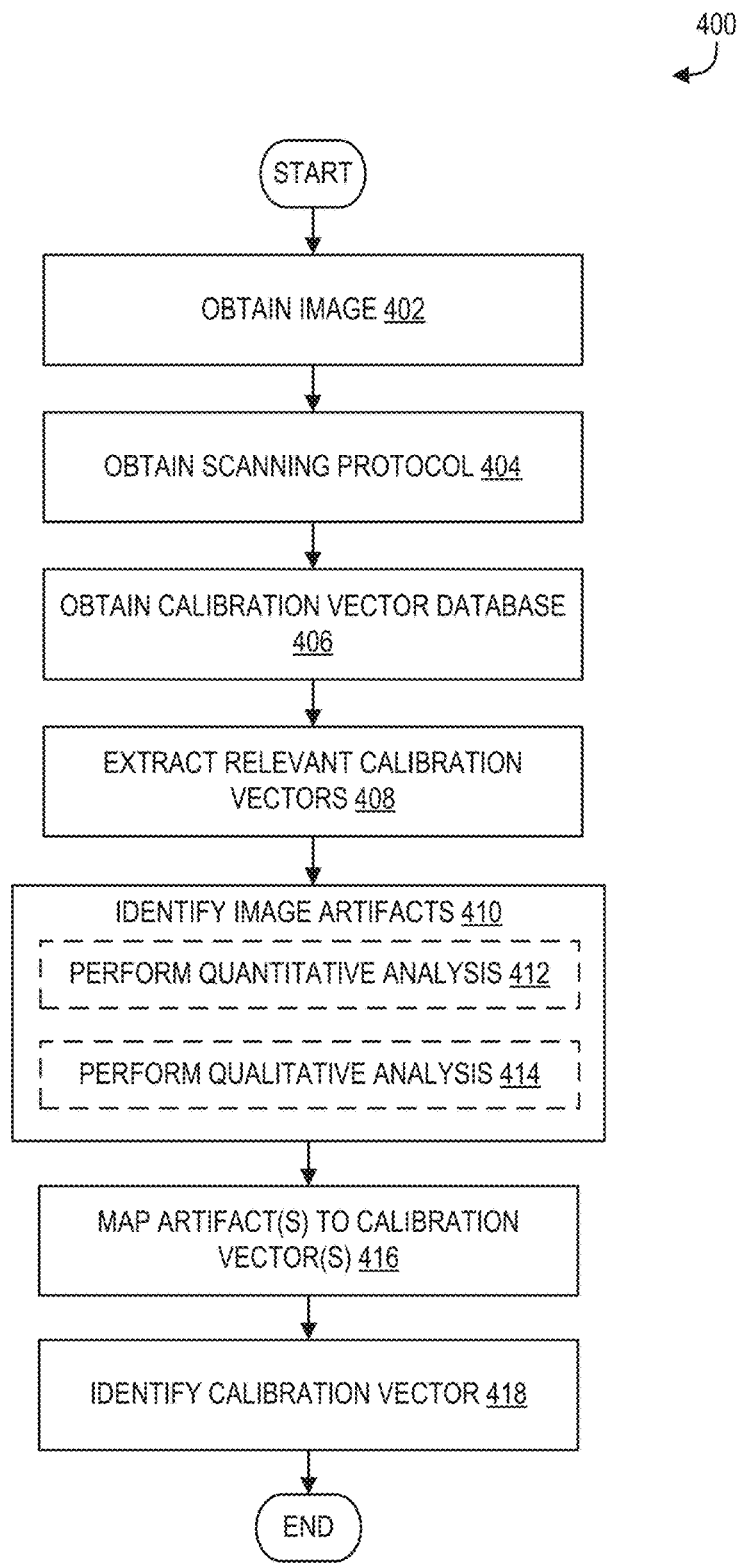
FIG. 4 shows a diagram of a method to identify an image artifact and a calibration vector associated with the artifact.

FIG. 4 shows a method 400 to identify an image artifact and one or more calibration vectors associated with that artifact. Method 400 may be stored on a data correction module, such as data correction module 240 and may be executed using one or more processor(s), e.g., the processor(s) of the computing device 216. Method 400 may be executed during the execution of method 300, which may invoke method 400 at 312.

At 402, method 400 includes obtaining an image. This image may comprise a QA image or a medical image, and may contain one or more imaging artifacts.

At 404, method 400 includes obtaining a scanning protocol. The scanning protocol may be identified via data associated with the image obtained at 402, e.g., within the image metadata, such as a digital imaging and communications in medicine (DICOM) header. For example, the DICOM header may include one or more tags that may be mapped to a scanning protocol used to obtain the image via a protocol mapping function, and the scanning protocol may be identified from a protocol library based on the mapping. In other examples, an identification of and/or the specific details of the scanning protocol may be saved with the image. The scanning protocol may include a plurality of details associated with a scan used to create the image, including a modality of the scan, the imaging prescription (e.g., source voltage/current), one or more resolutions of the scan, a reconstruction technique used to generate the image, slice thickness, the anatomy imaged by the scan (if the image is a medical image), the type of phantom used for the scan (if the image is a QA image), and/or additional data.

At 406, method 400 includes obtaining a calibration vector database. The calibration vector database obtained at 406 is an example of the calibration vector database 242. As described above, the calibration database may contain all calibration vectors usable by the data correction module, including one or more calibration vectors correlated with the artifacts within the images.

At 408, method 400 includes extracting one or more relevant calibration vectors from the calibration vector database. The calibration vectors extracted at 408 from the calibration vector database may be selected based on the scanning protocol, e.g., the calibration vectors that are extracted may be all of the vectors which were applied in the scanning protocol. For example, in a low kVp CT scan, a calibration vector associated with a low kVp x-ray source emission may be extracted, while a calibration vector associated with high kVp x-ray source may not be extracted. Extraction of only the relevant calibration vectors allows for fewer calibration vectors to be adjusted overall, which ultimately reduces the downtime of the imaging system, since fewer calibration scan images need to be obtained (e.g., during the execution of method 300).

At 410, method 400 includes identifying one or more image artifacts. Artifacts from the image include, but are not limited to, band artifacts, smudge artifacts, beam hardening artifacts, and x-ray detector burn-in artifacts. The artifacts may be resolved through qualitative and/or quantitative means, as explained below. In some examples, the artifacts may be identified manually or semi-manually, e.g., through the input of a clinician. For some artifacts, an artifact value may be computed. The artifact value may represent a severity of the artifact, and may be expressed numerically, e.g., as a percentage of the image's area affected by the artifact. Identification of the artifacts within the image allows for the identification of a number of calibration vectors associated with those artifacts, as explained below.

As indicated at 412, identifying the image artifacts may include performing quantitative analysis. The quantitative analysis may comprise, for example, measurement of regions of the image which do not correspond to an expected value (e.g., measurements of circular ring shapes, circular band shapes, and amorphously shaped objects in the center of the image).

As indicated at 414, identifying the image artifacts may include performing qualitative analysis. Qualitative analysis may be performed through the use of a qualitative image artifact identification model. The qualitative image artifact identification model comprises a machine-learning model, e.g., a deep learning model, trained to identify artifacts. Training data used to train the qualitative image artifact identification model may comprise a plurality of artifact-image pairs, wherein images with artifacts are paired with identifications of those artifacts. An example method usable to train the qualitative image artifact analysis model is explained in further detail with respect to FIG. 5.

At 416, method 400 includes mapping the artifacts to one or more calibration vectors. Mapping the artifacts to the one or more calibration vectors may comprise inputting each of the identified artifacts into an artifact LUT and/or a calibration vector identification model, each of which may be stored within the data correction module. The artifact LUT may return a list of calibration vectors, each of which may affect the presence and/or intensity of the input artifact. Thus, the artifact LUT is usable to return a list of calibration vectors correlated to the one or more artifacts. In some examples, the artifact LUT may be predetermined and stored within the calibration vector database. If a calibration vector identification model is implemented, the model may take as input one or more artifacts and return a list of calibration vectors correlated with the artifact. The calibration vector identification model may comprise, for example, a neural network trained to map the artifacts to calibration vectors.

At 418, method 400 includes identifying one or more calibration vectors. The calibration vectors may be identified by cross-referencing the calibration vector(s) identified by the artifact LUT at 416 and the relevant calibration vectors extracted at 408 to identify one or more calibration vector(s) present in both (e.g., the calibration vectors correlated to the image artifact(s) as well as the calibration vectors identified based on the scanning protocol). Method 400 returns, with the identified calibration vector usable in further methods, including methods to update the identified calibration vector, such as method 600. Calibration vectors which are uncorrelated to the image artifact and/or not identified based on the scanning protocol are not used in further methods, e.g., not updated.

Figure 5:
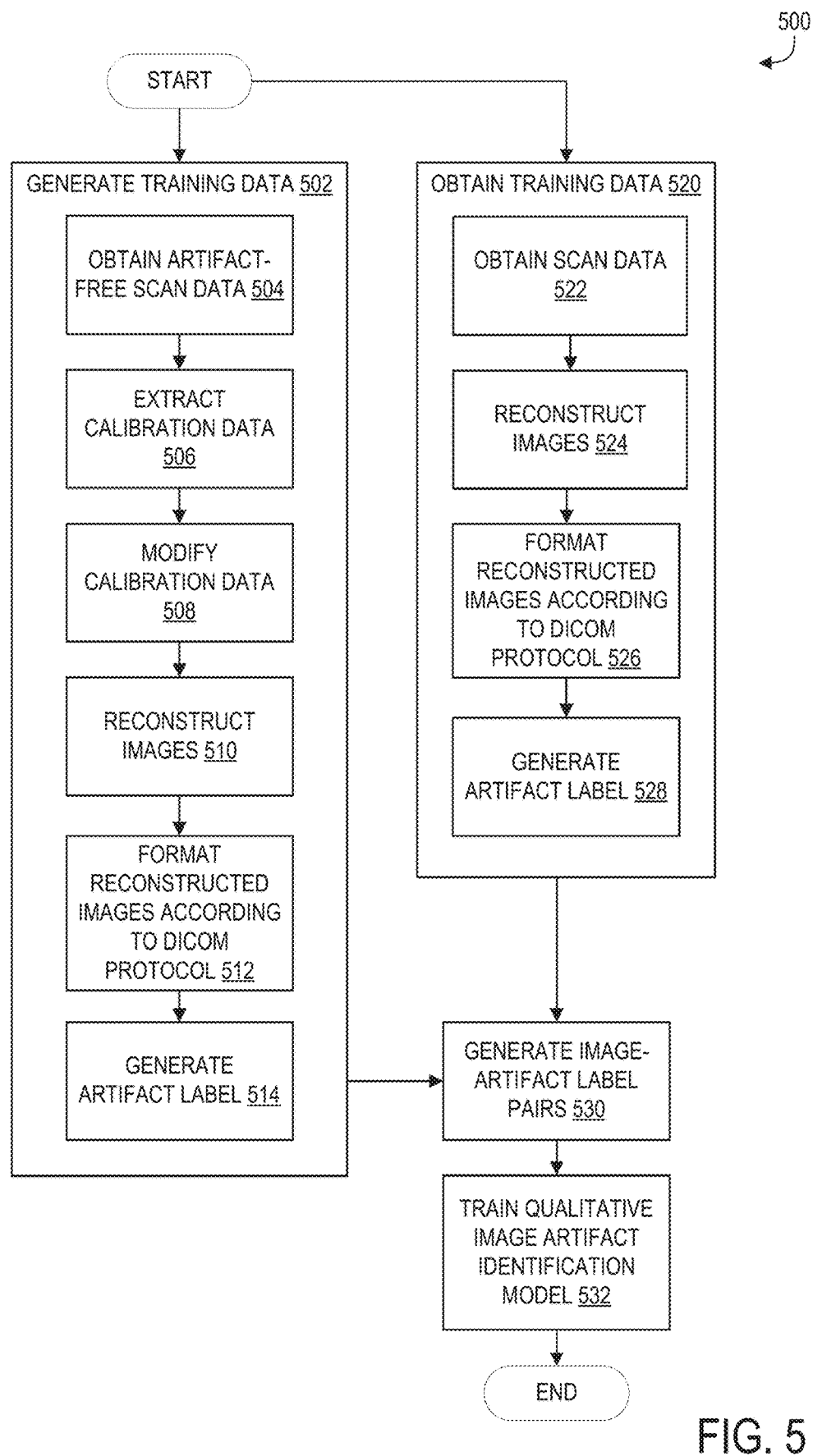
FIG. 5 shows a method to generate or obtain training data usable to train a qualitative image analysis deep learning model.

FIG. 5 shows a method 500 for training a qualitative image artifact identification model. Method 500 may be executed on hardware with access to medical images and/or calibration scan images. For example, method 500 may be represented as machine-readable instructions stored within the data correction module 240, and may execute on one or more processor(s), such as the processor(s) of the computing device 216. The qualitative image artifact identification model generated by method 500 may be stored within the data correction module, and is configured to take as input an image (e.g., a medical image or a calibration image) and return a list of one or more image artifacts visible in the image, including, for example, x-ray detector burn-in artifacts, band artifacts, smudge artifacts, and others. The qualitative artifact identification model generated by method 500 may be used in method 400, e.g., to perform qualitative analysis at 414.

Artifacts identified by the qualitative artifact identification model may be used to find one or more calibration vectors correlated to the artifacts. The artifacts correlated to the artifacts may be updated through the use of one or more calibration scans, whereas calibration vectors uncorrelated to the artifacts may not be updated, thereby simplifying the calibration process by reducing the number of calibration scans performed.

Method 500 depicts two parallel processes for gathering training data that can be used to train the qualitative image artifact identification model. The first process, shown at 502, includes generating the training data from one or more scans performed with an imaging system (e.g., the CT system of FIGS. 1 and 2). The second process, shown at 520, includes obtaining training data from scans that have been performed previously. In some examples, only one process may be performed to gather the training data, e.g., the training data may all be generated as explained at 502 or the training data may all be obtained as explained at 520. In other examples, both processes may be performed, such that a portion of the training data may be generated while the remaining training data may be obtained. For example, obtaining training data may be preferred to generating training data, since generating training data is more computationally intensive than generating training data. Generating training data may be performed if some of the training data is not available to be obtained. Alternatively, generating the training data may result in a more-accurately trained model since the artifacts are generated by adjusting the calibration vectors and thus the mapping between the calibration vectors and the artifacts is known.

At 502, the first process of method 500 includes generating training data. As explained in further detail below, generating training data may comprise reconstructing artifact-free images, adjusting calibration vectors, reconstructing the images using the adjusted calibration vectors, and labelling the resulting image artifacts with their corresponding image.

At 504, method 500 includes obtaining artifact-free scan data. The artifact-free scan data may be data obtained during a calibration scan or a scan that is usable to create an image. The artifact-free scan data may be obtained from a correctly calibrated imaging system, e.g., an imaging system wherein full calibration has been recently performed. The scan data obtained at 504 is further usable to construct an artifact-free image. In the example of a CT imaging system, the scan data may comprise, for example, a sinogram.

At 506, method 500 includes extracting calibration data. This may comprise, for example, obtaining the calibration vector database of the imaging system (e.g., the calibration vector database 242) used to generate the artifact-free scan. In some examples, the entire calibration vector database may be extracted. In other examples, only a portion of the calibration vectors within the calibration database may be extracted, with those extracted calibration vectors corresponding to the scanning protocol used to perform the artifact-free scan.

At 508, method 500 includes modifying the calibration data. This comprises adjusting one or more of the calibration vectors extracted at 506. Calibration vectors to be modified are selected to correspond to the scanning protocol used to perform the artifact-free scan. For example, in a CT imaging system, a sensitivity of the x-ray detectors may be adjusted, e.g., set to be either a higher or lower value in response to a measured radiodensity of an image. The modified calibration vectors may be saved, thereby generating a set of modified calibration data.

Figure 11:
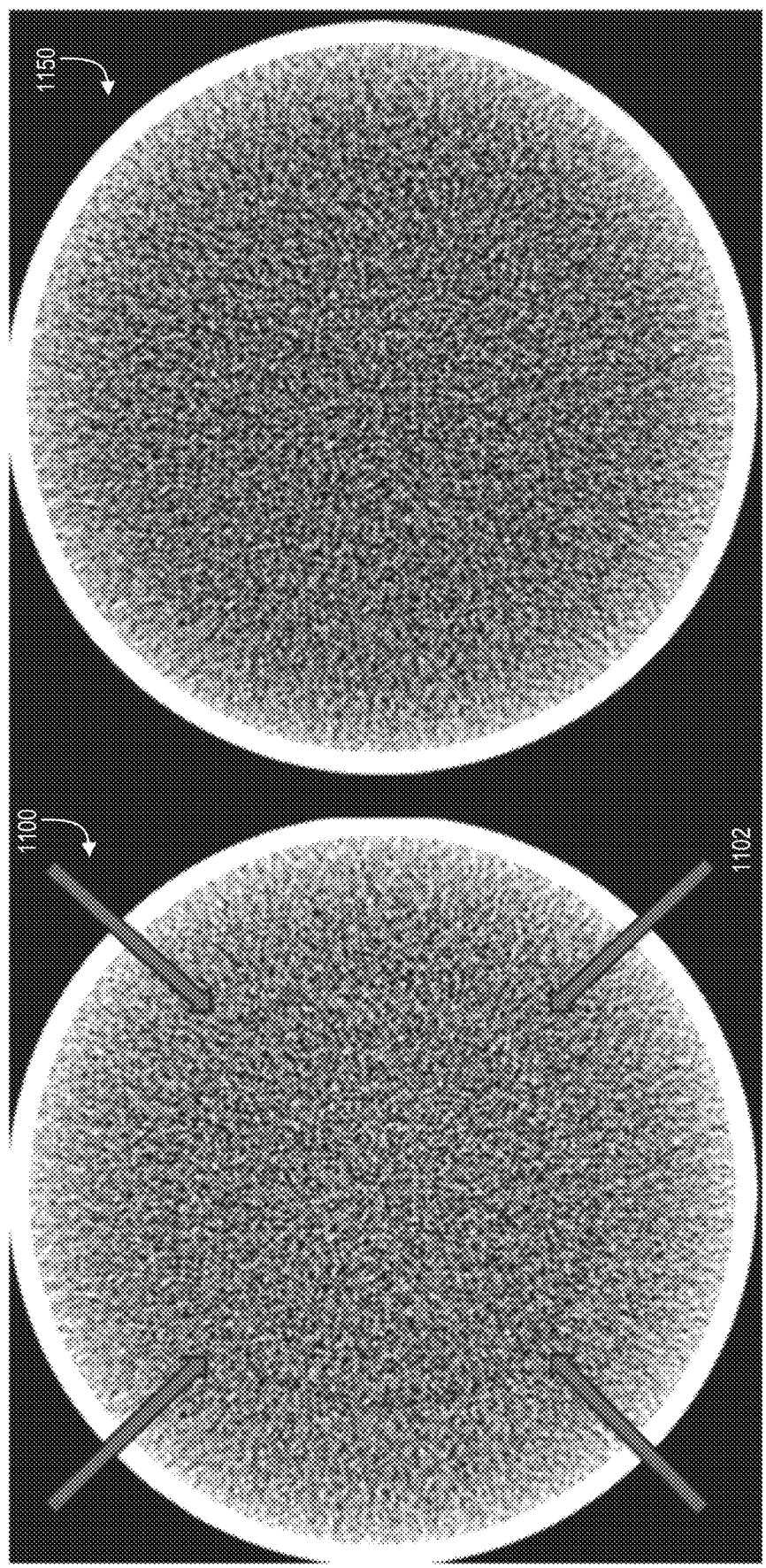
FIG. 11 shows a first calibration scan image obtained from an uncalibrated imaging system and a second calibration scan image obtained from a calibrated imaging system.

At 510, method 500 includes reconstructing one or more images. The image(s) may be reconstructed using the modified calibration data generated at 508. Modification of the calibration data may cause one or more artifacts to be visible within the reconstructed image. For example, modifying the vector used to compensate the detector energy response within a CT system may generate an image featuring a band artifact or a smudge artifact. An example of a CT image featuring a band artifact is shown in FIG. 11.

At 512, method 500 includes formatting the reconstructed images according to the DICOM protocol, to thereby form DICOM images. The DICOM images may include information about the image(s) generated at 510, such as the imaging modality used to acquire the data for the images, one or more resolution(s) of the image, the scan protocol implemented when performing the artifact-free scan, the time and date of image acquisition, and more. The DICOM header may be stored alongside the image in memory, e.g., within the PACS system.

At 514, method 500 includes generating an artifact label. The artifact label represents which artifact(s), if any, are present in the image(s) reconstructed at 510. The artifact list may take the form of, for example, a text document which is linked to the reconstructed image. In some examples, the artifacts may be identified (and labelled) by a clinician. In some examples, an artifact value may be specified, where the artifact value encodes information about the severity of the artifact. For example, for a smudge artifact, the artifact value may be given as a ratio of an approximate area affected by the smudge artifact to the area of the entire image. In examples, the value of a beam hardening artifact may comprise taking a difference between a measured radiodensity value and a known radiodensity value at a given point within an image, or by computing the difference between a radiodensity value at the center of an image and a radiodensity value at an outer region of the image.

At 520, the second process of method 500 includes obtaining training data. As described below, the training data may comprise scan data from a number of medical scans and/or quality assurance scans. The scans are usable to reconstruct images, which may contain one or more artifacts.

At 522, method 500 includes obtaining scan data. This may include scan data usable to reconstruct one or more images, e.g., medical images or a calibration images, such that a reconstructed image contains an artifact. The scan data may be sourced from, for example, an imaging system, such as a CT imaging system.

At 524, method 500 includes reconstructing the images. Reconstruction may be performed according to virtually any reconstruction technique, including a filtered back-projection, an analytical reconstruction, or other methods. The reconstruction of the images at 524 may utilize a set of calibration data obtained from, for example, the imaging system used to capture the scan data acquired at 522.

At 526, method 500 includes formatting the reconstructed images according to the DICOM protocol, to thereby form DICOM images. The DICOM images may include information about the image(s) generated at 524, such as the imaging modality used to acquire the data for the images, one or more resolution(s) of the image, the scan protocol implemented when performing the artifact-free scan, the time and date of image acquisition, and more. The DICOM header may be stored alongside the image in memory, e.g., within the PACS system.

At 528, method 500 includes generating an artifact label. The artifact label may be generated through identifying an artifact within the reconstructed image. As with the artifact label generated at 514, the artifact label generated at 528 may further contain an artifact value, e.g., a numerical quantity representing the severity of the artifact.

At 530, the first and second processes converge and method 500 includes generating one or more artifact-image label pairs. Each artifact-image label pair may be generated using training data generated at 502 and/or training data obtained at 520. Each piece of training data includes both an image with an artifact and a label which describes that artifact (e.g., which type of artifact it is, the location of the artifact within the image, an artifact value, etc.). The collection of image-artifact label pairs is usable to train a qualitative image artifact identification model, e.g., the qualitative image artifact identification model used in method 400 to identify image artifacts. Thus, when the artifact-image label pairs include at least some pairs that are generated with the training data generated at 502, at least some of the images are generated by introducing artifacts in the at least some of the images, where the introduced artifacts are introduced by adjusting one or more calibration vectors applied to generate the at least some of the images.

At 532, method 500 includes training the qualitative image artifact identification model. Training the qualitative image artifact identification model may include entering each image from the artifact-image label pairs as input to the model and, for example, adjusting a plurality of weights and biases of the model according to a loss between an output of the model and each corresponding label (e.g., the ground truth). The qualitative image artifact identification model trained at 532 may be saved within the data correction module such that it is accessible to other data correction methods, including method 300 and method 400.

In some examples, the qualitative image artifact identification model may be trained to output a list of possible calibration vectors to be updated based on identified image artifacts. For example, when the training data that is used to train the qualitative image artifact identification model includes the training data generated at 502, the training data may include, for each image, one or more ground truth calibration vectors that include an indication of which calibration vector(s) were adjusted in order to introduce the artifact(s) to that image. The qualitative image artifact identification model may be trained based on a loss between calibration vectors output by the qualitative image artifact identification model and the ground truth calibration vectors.

Figure 6:
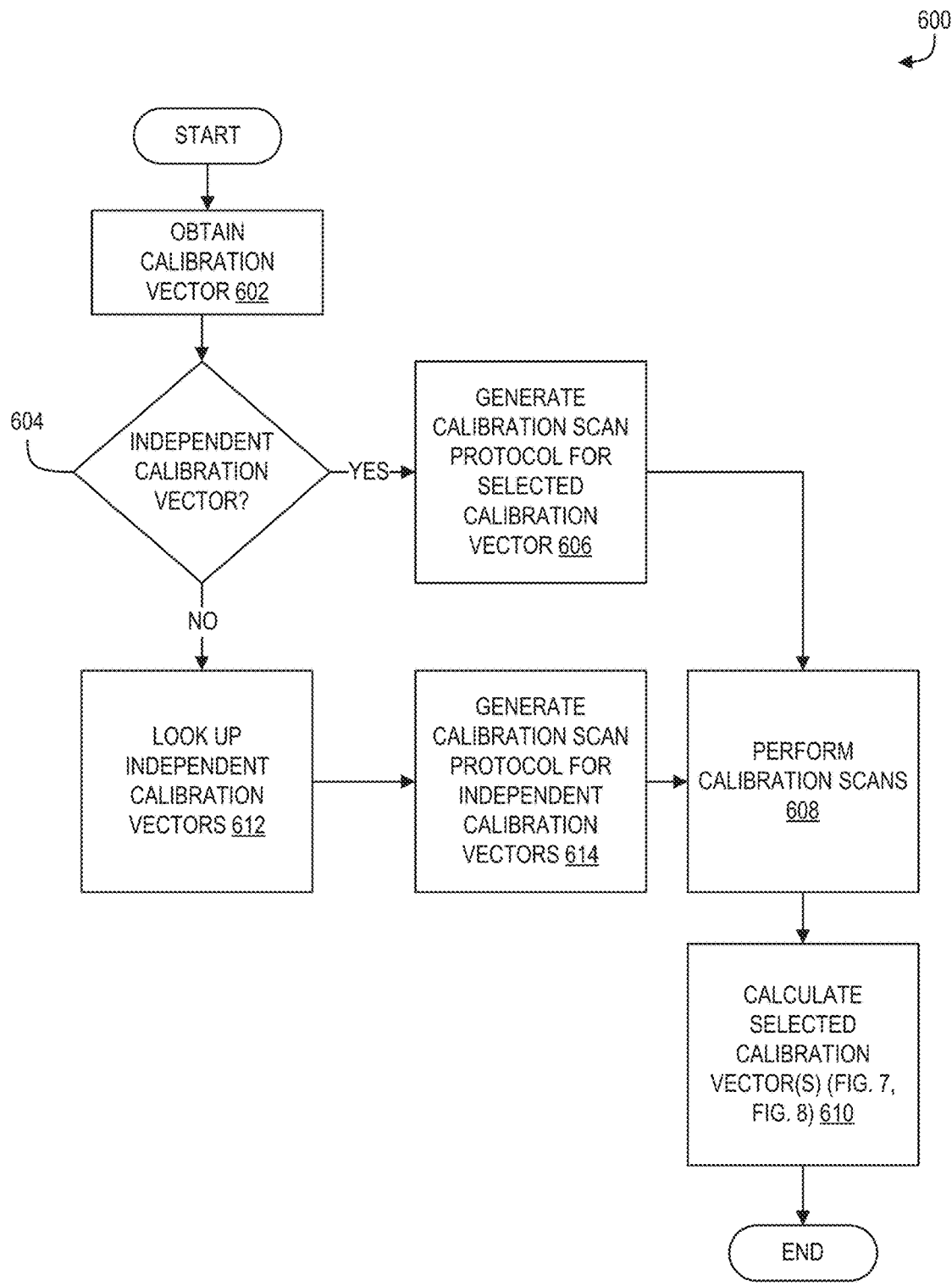
FIG. 6 shows a method to compute independent or dependent calibration vectors.

FIG. 6 shows a method 600 for performing calibration scans and updating calibration vectors. Method 600 may be stored within a data correction module, such as the data correction module 240; method 600 is executable using one or more processors, such as the processors within the computing device 216. Method 600 may be invoked during the execution of method 300, e.g., at 312. Method 600 takes as input (and produces as output) one or more calibration vectors, which may be stored in a calibration vector database, e.g., the calibration vector database 242. Method 600 may further use one or more previous values of calibration vectors, which may be obtained from the calibration vector database.

Method 600 is usable to scan one or more objects in order to generate one or more digital images with a plurality of different artifacts. Each of the image artifacts may be correlated with one or more calibration vectors. The calibration vectors correlated with the image artifacts may be updated, while calibration vectors uncorrelated with any of the plurality of artifacts may not be updated, therefore reducing the amount of calibration scans performed (e.g., compared to the performance of a detailed calibration scan). The calibration scans are performed only to obtain the calibration data for updating the calibration vector and not to obtain any other calibration data usable to update any other calibration vectors.

At 602, method 600 includes obtaining a calibration vector. For example, the obtained calibration vector may be a calibration vector associated with a particular image artifact, e.g., as identified through the use of an artifact LUT and/or an artifact identification model, as described in further detail above with respect to FIG. 4. The calibration vector obtained at 602 may be an independent or a dependent calibration vector, which are explained in further detail below.

At 604, method 600 includes determining if the calibration vector is an independent calibration vector. If yes, method 600 proceeds to 606. Otherwise, method 600 proceeds to 612. Independent calibration vectors are those calibration vectors which are not directly calculated from other calibration vectors. Determining whether or not the calibration vector is an independent calibration vector may comprise, for example, checking the vector against a list of independent vectors which may be stored within the calibration vector database.

Calibration vectors which are not independent calibration vectors are dependent calibration vectors. Dependent calibration vectors may be directly computed through the use of one or more independent calibration vectors and may be specified, for example, through a mathematical formula which takes the values of the associated independent calibration vectors as arguments. To specify which independent calibration vectors a given dependent calibration vector takes as arguments, the calibration vector database contains a dependent calibration vector LUT, which takes as input a dependent calibration vector and returns one or more associated independent calibration vectors.

At 606, method 600 includes generating a calibration scan protocol for the selected calibration vector. The calibration scan protocol is usable to perform a calibration scan, which is explained in further detail below. The calibration scan protocol is generated based on the selected calibration vector in order to update the selected calibration vector. For example, if the calibration vector is a beam hardening calibration vector, the calibration scan protocol may specify the use of a water CT phantom, which has known radiodensity usable to compute the value of the beam hardening calibration vector through adjusting the beam hardening calibration vector such that the CT numbers in the reconstructed image match known values (e.g., the beam hardening artifact is correlated with the beam hardening calibration vector). The calibration scan protocol may specify the type of scan to be performed, the scan prescription, and other attributes. As explained below, calibration scan protocols may not be generated for all calibration vectors. Method 600 proceeds to 608, which is explained in further detail below.

Returning to 604, if it is determined that the obtained calibration vector is not an independent calibration vector, the calibration vector is assumed to be a dependent calibration vector, and method 600 proceeds to 612. At 612, method 600 includes looking up independent calibration vectors. This may comprise, for example, inputting the dependent calibration vector into the dependent calibration vector LUT, which returns one or more associated independent calibration vectors. Since the dependent calibration vector is calculable from the associated independent calibration vectors, the associated independent calibration vectors may first be calculated through the use of one or more calibration scans, as explained below. In some examples, the previous values of one or more of the associated calibration vectors may be obtained at 612. Previous values of independent calibration vectors may be specified by a clinician, e.g., in the event that one or more of the independent calibration vectors usable to calculate the dependent calibration vector were recently calibrated. Use of the previous values of one or more independent calibration vectors to calculate the dependent vector is described in additional detail with respect to FIG. 8.

At 614, method 600 includes generating a calibration scan protocol for the independent calibration vectors. In some cases, the previous value(s) of one or more independent calibration vector(s) may be used instead of an updated value generated from calibration scan data, as explained in further detail with respect to FIG. 8. The calibration scan protocols generated at 614 may be generated in a similar way to the calibration scan protocols generated for independent vectors at 606. In some examples, the number of calibration scan protocols generated is equal to the number of independent calibration vectors identified at 612. In other examples, one or more calibration scan protocols generated at 614 may be usable to correct more than one independent calibration vector. Method 600 proceeds to 608.

At 608, method 600 includes performing calibration scans. If the selected calibration vector is dependent, calibration scans may be performed according to the scan protocols generated at 614. If the selected calibration vector is independent, the calibration scan is performed according to the calibration scan protocol generated at 606. If previous values for one or more independent calibration vectors were obtained, calibration scans are not performed to generate data usable to update the previous independent calibration vectors. Calibration scans performed at 608 are usable to calculate the value of the selected calibration vector, whether the selected calibration vector is an independent or dependent calibration vector.

At 610, method 600 includes calculating the selected calibration vector. For independent calibration vectors, calculating the selected calibration vector may comprise using the scan data generated at 608 to reconstruct one or images. The reconstructed images may contain one or more artifacts. The artifacts may be evaluated (e.g., through computing an artifact value for each artifact) and used to calculate an updated calibration vector, which represents a new value of the selected calibration vector. In other examples, previous values of independent calibration vectors may also be obtained instead of computing all independent calibration vectors through the use of scan data, which allows for fewer calibration scans to be performed.

Figure 7:
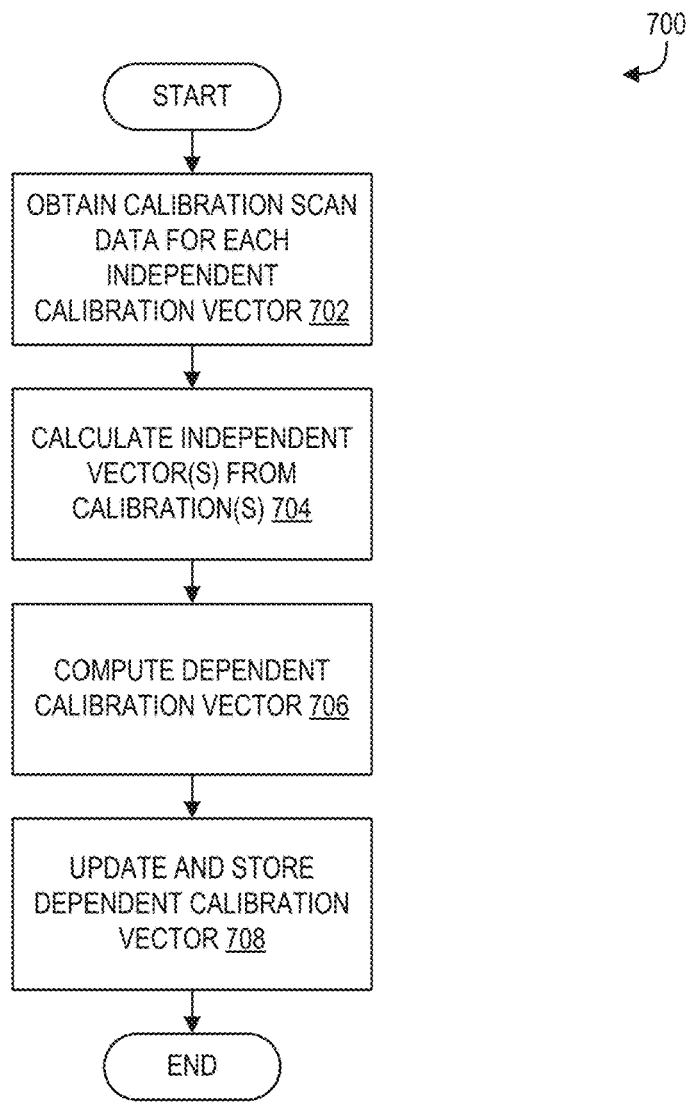
FIG. 7 shows a method to update a dependent calibration vector through the use of scans obtained for one or more independent calibration vectors.
Figure 8:
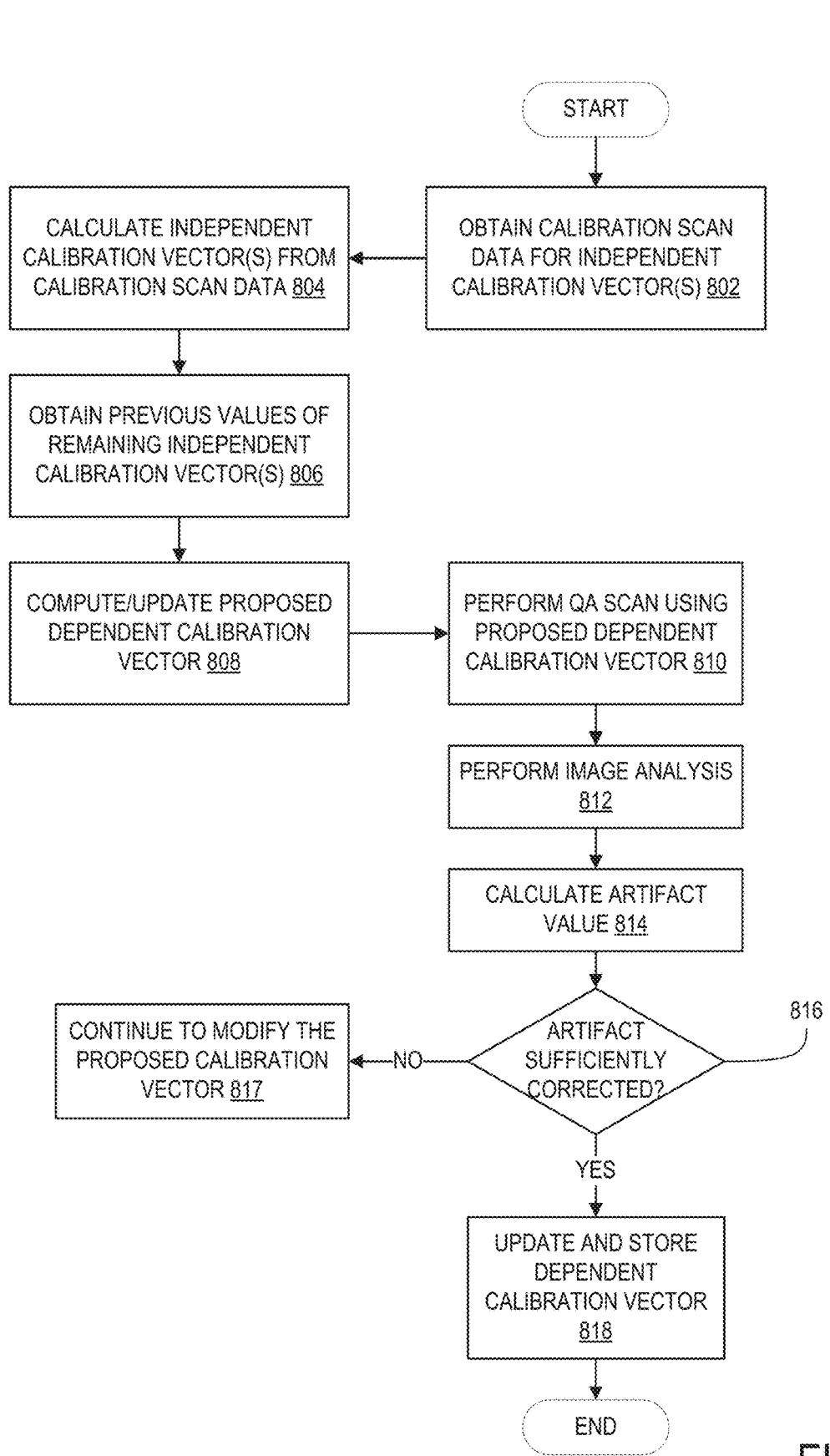
FIG. 8 shows a method to update a dependent calibration vector through the use of scans obtained for independent vectors and/or previous values of independent calibration vectors.

If the selected calibration vector is a dependent calibration vector, its corresponding independent calibration vectors may be calculated as well, e.g., according to the independent calibration vector calculation method described above. In some examples, calibration scan data for each of the dependent vector's associated independent calibration vector may be obtained, allowing updated values of each independent calibration vector to be computed from the independent calibration scan data (e.g., as generated at 608). A method for computing the dependent calibration vector from the independent calibration vector scan data is shown in FIG. 7. In other examples, the previous values of one or more independent calibration vectors may be used instead of calibration scan data, as explained above. A method for dependent calibration vector calculation using one or more previous values of the independent calibration vectors is shown in FIG. 8. Method 600 ends.

FIG. 7 shows a method 700 for calculating, updating, and storing a dependent calibration vector. Method 700 may be stored as a sequence of machine-readable instructions within a data correction module, e.g., the data correction module 240. Method 700 is executable through one or more processor(s), e.g., the processor(s) of the computing device 216. The computation of the dependent vector depends on a plurality of independent vectors, each of which may be resolved through the use of one or more calibration scans, as discussed in further detail with respect to FIG. 6.

At 702, method 700 includes obtaining calibration scan data for each independent vector. Which calibration scan data is obtained at 702 may be specified, for example, through the use of a dependent vector LUT, which indicates the independent vectors usable to calculate the dependent calibration vector. The calibration scan data may be obtained through the use of one or more calibration protocol(s), e.g., the calibration protocols generated at 614 of method 600.

At 704, method 700 includes calculating the independent calibration vectors from the calibration scan data. The independent calibration vectors may be computed in a number of ways. For example, in CT, the calibration scan data may include projection data (e.g., raw or processed detector data), which may be compared to a simulated or ideal projection data generated from, for example, a simulation. The ideal projection data and the projection data generated from the calibration scan data may be compared, allowing for the generation of a model which details the differences between the measured calibration data and ideal calibration data. The difference between the measured calibration data and the ideal calibration data allows for the generation of a calibration vector. This process may further include, for example, interpolation of the data and/or fitting according to an empirical model. This process may be repeated for each of the calibration scan data for independent calibration vectors obtained at 702.

In some examples, qualitative and/or quantitative analysis may be performed on the reconstructed images to detect the presence of artifacts. For example, a model trained to detect band artifacts may be used to test for their presence and/or severity. In some examples, the results from an image artifact identification algorithm may be presented to a clinician to assist in the calibration process.

At 706, method 700 includes computing the dependent calibration vector. In some examples, the dependent calibration vector may be given explicitly as a function of the independent calibration vectors. This dependence may be specified in the dependent vector LUT. For example, given an independent vector A, an independent vector B, and an independent vector C, a dependent vector N may be computed according to $N=(A+B) \times C$.

Figure 9:
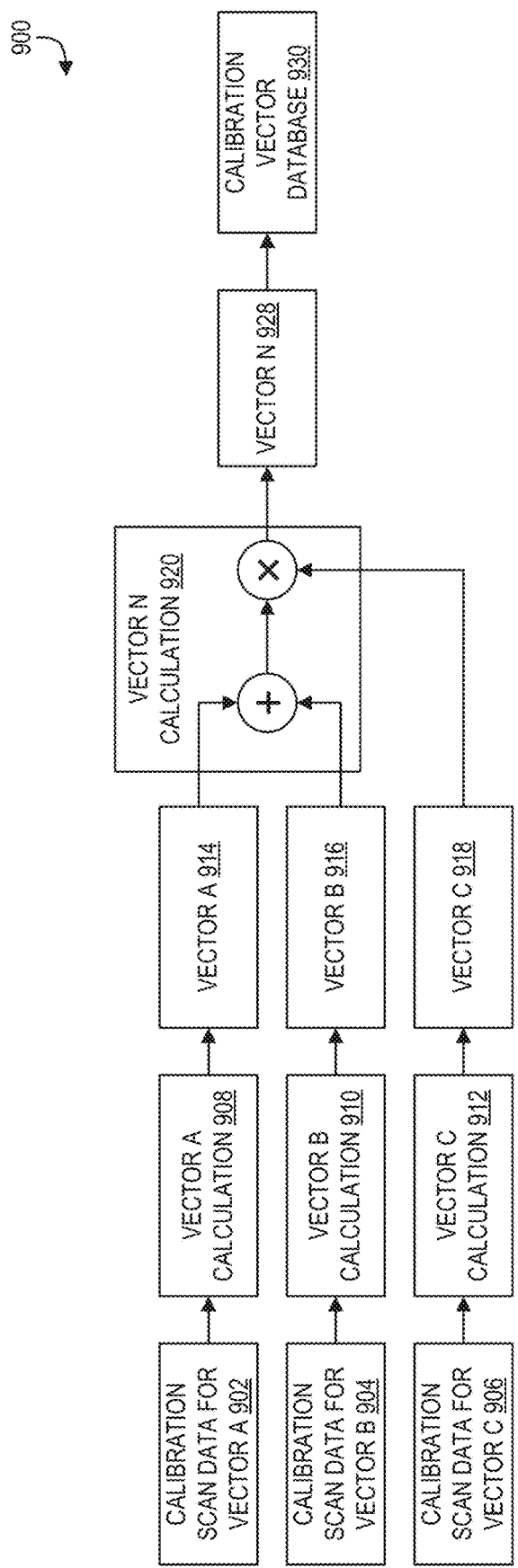
FIG. 9 shows an example diagram for the calculation of a dependent calibration vector from the calibration scan data for three independent vectors according to a first example method.

At 708, method 700 includes updating and storing the dependent calibration vector. This comprises storing the dependent calibration vector calculated at 706 within the calibration vector database. In some examples, the updated independent calibration vectors may also be stored within the calibration vector database. Method 700 ends. An example diagram of a calibration vector calculated according to method 700 is shown in FIG. 9.

FIG. 8 shows a method 800 for updating independent and dependent calibration vectors through the use of one or more existing calibration vectors. Method 800 may be stored within a data correction module, such as the data correction module 240. Method 800 may be executed using one or more processor(s), such as the processor(s) of the computing device 216. As with method 700 above, computation of the dependent vector depends on a plurality of independent vectors, each of which may be resolved through the use of one or more calibration scans, as discussed in further detail with respect to FIG. 6. Since method 800 is configured to retrieve and/or modify calibration vectors, method 800 utilizes access to a calibration vector database, e.g., the calibration vector database 242.

At 802, method 800 includes obtaining calibration scan data for one or more independent calibration vectors. As described above, the calibration scan data for independent vectors are usable to calculate and update a portion of the independent calibration vectors. The calibration scan data obtained at 802 is usable to generate one or more calibration scan images, as explained below. The remaining portion of the independent calibration vectors may be obtained from the calibration vector database at 806.

At 804, method 800 includes calculating the independent calibration vectors from the calibration scans. This may comprise, for example, adjusting the independent calibration vectors such that the artifacts in a reconstructed image are minimized, as described above. Only the independent calibration vectors for which a calibration scan was acquired may be updated at 804.

At 806, method 800 includes obtaining previous values for the remaining independent calibration vectors. The previous independent calibration vectors obtained at 806 are sourced from the calibration vector database. The independent calibration vectors obtained at 806 are those independent calibration vectors used to calculate the dependent calibration vector but not calculated at 804.

At 808, method 800 includes computing/updating a proposed dependent calibration vector. The dependent calibration vector may be computed, through an explicit mathematical formula, which, as explained above, may be sourced from a dependent calibration vector LUT. For example, if a dependent calibration vector N is given in terms of an independent calibration vector A, an independent calibration vector B, and an independent calibration vector C according to N=(A+B)×C, a value for vector C may be calculated from calibration scan data and the previous values of vector A and vector B may be used to perform the calculation of vector N.

Computing/updating of the proposed dependent calibration vector at 808 may be further invoked as a result of the image artifact not being sufficiently corrected. In some examples, the proposed dependent calibration vector may be updated directly, e.g., adjusted in such a way that an artifact value (described in further detail below) is reduced in magnitude. In other examples, the previous values of the independent vectors obtained at 806 may be adjusted (e.g., vector A and vector B in the example above), allowing the proposed dependent vector to be updated according to their new values (e.g., according to N=(A+B)×C).

At 810, method 800 includes performing a QA scan using the proposed dependent calibration vector. The QA scan is used to generate a QA image, usable to resolve one or more image artifacts. The QA scan is performed according to a scan protocol, which may be generated depending on the dependent vector, e.g., at 606 of method 600, where the selected vector is the dependent vector. The QA image may be acquired and/or reconstructed using a number of calibration vectors: the proposed dependent calibration vector and the independent calibration vectors obtained at 804 and at 806.

At 812, method 800 includes performing image analysis. For example, the image may be analyzed either qualitatively or quantitatively, including analysis performed to detect the presence of one or more image artifacts, e.g., through the use of a qualitative image artifact identification model, which may comprise a machine learning model trained according to, for example, method 500.

At 814, method 800 includes calculating an artifact value. The artifact value, as described above, represents a severity of the artifact within the QA image. For example, the artifact value may represent the density of the area within the image affected by the imaging artifacts, including band artifacts, ring artifacts, and smudge artifacts.

Figure 10:
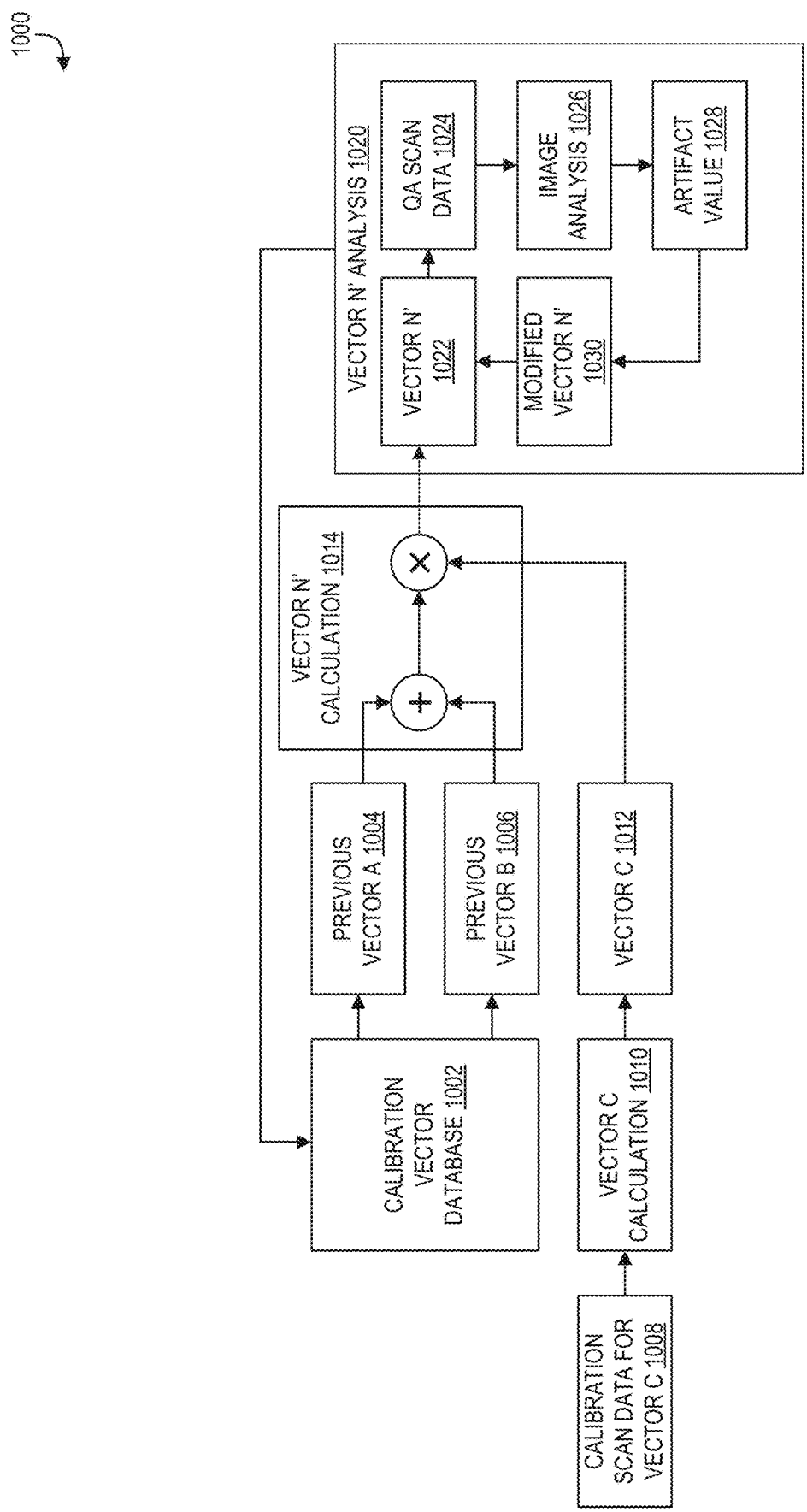
FIG. 10 shows an example diagram for the calculation of a dependent calibration vector from both the calibration scan data for two independent calibration vectors and the previous value of one independent calibration vector according to a second example method.

At 816, method 800 includes determining if the artifact is sufficiently corrected. This may be determined through comparing the artifact value calculated at 814 to a predefined threshold, for example. If the artifact is sufficiently corrected, for example if the artifact value is below the threshold, method 800 proceeds to 818, where the proposed updated dependent vector is confirmed as sufficiently correcting the image artifact and thus may be stored in memory (e.g., in the calibration vector database) and applied in future scans. In some examples, the portion of independent calibration vectors for which calibration scan data was obtained may be updated within the calibration vector database as well. Method 800 ends. An example diagram showing the calculation of a dependent vector using method 800 is shown in FIG. 10. Otherwise, from 816, method 800 proceeds to 817, where method 800 includes continuing to modify the proposed dependent calibration vector, for example, by performing additional calibration scans to obtain additional calibration data. The additional calibration scan data obtained at 817 may comprise calibration scan data obtained for the correction of other calibration vectors, as multiple calibration vectors may affect the same image artifact. This may further include modifying the previous values of the independent vectors obtained at 806, e.g., through the use of additional calibration scan data usable to correct the previous values of the independent calibration vectors.

FIG. 9 shows an example diagram 900 illustrating an example calculation of a dependent vector according to a first method, e.g., method 700. In diagram 900, a dependent calibration vector N is computed from an independent calibration vector A, an independent calibration vector B, and an independent calibration vector C.

At 902, diagram 900 includes calibration scan data for vector A, at 904, diagram 900 includes calibration scan data for vector B, and at 906, diagram 900 includes calibration scan data for vector C. The calibration scan data for the three vectors may comprise, for example, data obtained from calibration scans performed using one or more imaging phantoms using scan protocols which are informed by their respective vectors. In this example, the three independent calibration vectors were calculated through the use of three separate sets of calibration data, but it should be noted that in some examples, one set of calibration data is usable to calculate more than one calibration vector.

Diagram 900 includes vector A calculation 908, vector B calculation 910, and vector C calculation 912. As explained in further detail above, vector A, vector B, and vector C may be computed from their respective sets of calibration data, and may be chosen to minimize image artifacts within images reconstructed from their respective sets of calibration data. The calculation of each vector results in vector A 914, vector B 916, and vector C 918.

Diagram 900 includes vector N calculation 920. In this case, vector N, which is a dependent vector, is computed from vector A 914, vector B 916, and vector C 918 through first adding vector A 914 to vector B 916, then multiplying their sum by vector C 918. The product is vector N 928 (that is, N=(A+B)×C).

Vector N 928 may be stored in a calibration vector database 930, which is an example of the calibration vector database 242. Since vector N 928 was computed from calibration scan data from each independent vector, e.g., the calibration scan data for vector A 904, the calibration scan data for vector B 904, and the calibration scan data for vector C 906, vector N 928 is directly saved to the calibration vector database 930 after being calculated, according to method 700.

FIG. 10 shows a diagram 1000 representing a second example of dependent calibration vector calculation, the second example comprising calculating the dependent vector from one set of calibration scan data for an independent calibration vector and from two previous independent calibration vectors. The dependent calibration vector calculation was performed according to method 800. The second example of dependent vector calibration represents examples where one or more of the independent calibration vectors are known to be sufficiently accurate, e.g., if the one or more independent calibration vectors are selected based on a physics model informed by one or more parameters which do not significantly change between scans. For example, an independent calibration vector associated with beam hardening artifacts for a known material (e.g., water) may not significantly change between different calibration scans, meaning that the previous value of the independent calibration vector is usable to compute the dependent calibration vector.

Diagram 1000 includes a calibration vector database 1002, which is an example of the calibration vector database 242 of FIG. 2. As described above, the calibration vector database 1002 is usable to store and retrieve calibration vectors. In this example, the calibration vector database is used to retrieve a previous independent calibration vector A 1004 and a previous independent calibration vector B 1006, each of which may have been computed and stored beforehand. In this example, both vector A 1004 and vector B 1006 are, as before, independent calibration vectors usable to compute a dependent vector.

Diagram 1000 includes a calibration scan for an independent calibration vector C 1008, which comprises a set of calibration scan data which is usable to calculate vector C. The calibration scan data for vector C 1008 is input into a vector C calculation 1010, which uses the calibration scan data to resolve the optimal value of vector C (e.g., according to method 600). The vector C calculation 1010 therefore produces as output a vector C 1012.

The previous vector A 1004, the previous vector B 1006, and the vector C 1012 are further input into a vector N' calculation 1014. As described above with respect to the vector N calculation 920, the vector N' calculation may be performed through adding the previous vector A 1004 to the previous vector B 1006, then multiplying their sum by vector C 1012 (e.g., N'=(A+B)×C). The result of the vector N' calculation 1014 is a vector N' 1022, which is further used as input for vector N' analysis 1020, which is configured to iteratively analyze vector N' 1022 in order to calculate a value for vector N' 1022 which minimizes imaging artifacts present in QA scans.

To perform the vector N' analysis 1020, vector N' 1022 may be used to perform a QA scan, which is usable to produce QA scan data 1024. The QA scan may comprise, for example, a calibration scan using a CT phantom performed according to a scan protocol, e.g., a scan protocol generated via method 600. The QA scan data 1024 may be used, for example, to generate a reconstructed image. The reconstructed image is input into image analysis 1026, which uses both qualitative and quantitative analysis to resolve which artifacts (if any) are present in the image generated from the QA scan data 1024. The image analysis 1026 is performed as explained above, through the use of a qualitative image artifact identification model, e.g., the qualitative image artifact identification model trained via method 500 and one or quantitative image metrics, including, as non-limiting examples, qualitative image metrics configured to quantify band artifacts, ring artifacts, and smudge artifacts.

Image analysis 1026 is configured to calculate an artifact value 1028, which ascribes a magnitude to one or more artifacts present in the image generated from the QA scan data 1024. For example, if vector N' 1022 is associated with a band artifact, the artifact value may contain information about the area within the QA scan affected by the band artifact.

The artifact value 1028 may be compared to a predetermined threshold, which is usable to determine whether or not the image generated by the QA scan 1024 is sufficiently artifact-free. If the artifact value 1028 is below the predetermined threshold, the vector N' 1022 is output from the vector N' analysis 1020 into the calibration vector database 1002. In this case, the vector N' has been found such that the image artifacts are sufficiently corrected.

Otherwise, if the artifact value 1028 is above the predetermined threshold, the vector 1022 is further usable as input into a vector N' modification, which applies an adjustment of vector N' 1022 in order to eliminate or sufficiently reduce the artifacts, e.g., to lower the artifact value, thereby producing a modified vector N' 1030. As described above, the vector N' adjustment may comprise either adjusting the previous vector A 1004 and/or the previous vector B 1006 before recalculating the value of vector N' using the new values of the independent calibration vectors. The modified vector N' 1030 is used to overwrite the vector N' 1022. The new vector N' 1022 is then used to generate further QA scan data 1024 (e.g., through another QA scan), where the process of analyzing the images and updating vector N' continues until the artifacts are determined to be sufficiently corrected according to the predetermined threshold.

FIG. 11 shows an example of a first CT image 1100 and a second CT image 1150. Both the first CT image 1100 and the second CT image were reconstructed from the same scan data. The first CT image 1100 is an image of a CT phantom, e.g., an air phantom, captured according to a high-kVp scan protocol. The first CT image 1100 features a visible band artifact 1102 (further emphasized with arrows). The band artifact is a result of detector sensitivity loss over time, e.g., due to exposure to ionizing radiation. Thus, a change in the detector's response to ionizing radiation during the scan manifests as the band artifact 1102 within the image. Using the modular calibration techniques described above, the calibration vector correlated with the band artifact was identified through the use of both quantitative image metrics and a qualitative image artifact identification model (with the model trained according to method 500). An updated value for the calibration vector was then computed based on an artifact value of the band artifact, and the updated calibration vector was used in a second reconstruction, e.g., the second CT image 1150. Second CT image 1150 is visibly less affected by the band artifact 1102, so the modular calibration method successfully corrected for the artifact.

Furthermore, since the modular calibration process did not update calibration vectors uncorrelated to the band artifact, the calibration process used to eliminate the band artifact did not incur the same downtime as would be required by a detailed calibration.

A technical effect of performing calibrations according to a targeted, modular calibration method is to reduce the amount of time used to perform the calibrations. In clinical practice, this may increase the usability of the imaging system, since targeted calibrations may be performed more often than detailed calibrations. This allows for clinicians to account for ordinary wear of mechanical and electronic components of the imaging system as they are used over the course of the imaging system's lifetime in clinical practice.

Furthermore, correction of a relatively small (e.g., compared to the list of all calibration vectors within a calibration vector database) collection of calibration vectors correlated to one or more image artifacts allows for a reduction in the computation time required to update the calibration vectors. Therefore, performance of modular calibration is possible through the use of a relatively small pool of computational resources, e.g., computing systems with limited memory and/or processing resources.

The disclosure also provides support for a method for calibrating a medical imaging system, comprising identifying a calibration vector to be updated based on an artifact in an image acquired with the medical imaging system, determining calibration data to be obtained with the medical imaging system based on the calibration vector, obtaining the calibration data with the medical imaging system, and updating the calibration vector based on the calibration data. In a first example of the method, identifying the calibration vector to be updated based on the artifact in the image comprises entering the image as input to a qualitative image artifact identification model trained to output the identification of the calibration vector based on the image. In a second example of the method, optionally including the first example, identifying the calibration vector to be updated based on the artifact in the image comprises identifying the artifact in the image based on a qualitative or quantitative image analysis and obtaining the identification of the calibration vector from a lookup table based on the identified artifact. In a third example of the method, optionally including one or both of the first and second examples, identifying the calibration vector to be updated based on the artifact in the image comprises identifying a list of possible calibration vectors to be updated based on the artifact and selecting the calibration vector from the list of possible calibration vectors based on an imaging protocol used to acquire the image. In a fourth example of the method, optionally including one or more or each of the first through third examples, determining calibration data to be obtained with the medical imaging system based on the calibration vector comprises generating a calibration protocol for a calibration scan to be carried out with the medical imaging system, and wherein obtaining the calibration data with the medical imaging system comprises controlling the medical imaging system to perform the calibration scan according to the calibration protocol. In a fifth example of the method, optionally including one or more or each of the first through fourth examples, the calibration scan is performed only to obtain the calibration data for updating the calibration vector and not to obtain any other calibration data usable to update any other calibration vectors. In a sixth example of the method, optionally including one or more or each of the first through fifth examples, updating the calibration vector comprises updating the calibration vector but not any additional calibration vectors uncorrelated with the artifact. In a seventh example of the method, optionally including one or more or each of the first through sixth examples, the method further comprises: performing a medical scan of a patient with the medical imaging system to generate one or more medical images of the patient, the medical scan carried out using the updated calibration vector. In an eighth example of the method, optionally including one or more or each of the first through seventh examples, determining calibration data to be obtained with the medical imaging system based on the calibration vector comprises determining that the calibration vector is an independent calibration vector, and in response, selecting a calibration protocol for a calibration scan to be carried out with the medical imaging system to obtain the calibration data, wherein the calibration protocol is selected based on the independent calibration vector. In a ninth example of the method, optionally including one or more or each of the first through eighth examples, determining calibration data to be obtained with the medical imaging system based on the calibration vector comprises determining that the calibration vector is a dependent calibration vector that depends from one or more independent calibration vectors, and in response, selecting a calibration protocol for a calibration scan to be carried out with the medical imaging system to obtain the calibration data, wherein the calibration protocol is selected based on the one or more independent calibration vectors.

The disclosure also provides support for a system, comprising: a medical imaging device for obtaining image data usable to generate one or more images, a computing device operably coupled to the medical imaging device and storing instructions in memory executable by one or more processors to: identify a calibration vector to be updated based on an artifact in an image of the one or more images acquired with the medical imaging device, determine calibration data to be obtained with the medical imaging device based on the calibration vector, obtain the calibration data with the medical imaging device, and update the calibration vector based on the calibration data. In a first example of the system, the memory stores a qualitative image artifact model trained to identify the calibration vector based on the artifact in the image. In a second example of the system, optionally including the first example, the qualitative image artifact model is trained with a plurality of artifact-image label pairs, each artifact-image label pair including a respective image with an artifact and a label identifying the artifact. In a third example of the system, optionally including one or both of the first and second examples, at least some images included in the plurality of artifact-image label pairs are generated by introducing artifacts in the at least some images, the introduced artifacts introduced by adjusting one or more calibration vectors applied to generate the at least some images. In a fourth example of the system, optionally including one or more or each of the first through third examples, the medical imaging device comprises a computed tomography imaging device.

The disclosure also provides support for a method for calibrating a medical imaging device, comprising: scanning one or more objects to generate one or more digital images with a plurality of different artifacts, processing the generated one or more digital images to correlate a first calibration vector with a first artifact of the one or more digital images and to correlate a second calibration vector with a second artifact of the one or more digital images, and updating the first calibration vector and the second calibration vector, but not a third calibration vector uncorrelated with the plurality of different artifacts of the one or more digital images. In a first example of the method, scanning the one or more objects to generate the one or more digital images comprises scanning one or more phantoms to generate one or more quality assurance images. In a second example of the method, optionally including the first example, processing the generated one or more digital images to correlate the first calibration vector with the first artifact and to correlate the second calibration vector with the second artifact comprises entering the one or more digital images as input to a qualitative image artifact identification model trained to identify the first calibration vector based on the first artifact and identify the second calibration vector based on the second artifact. In a third example of the method, optionally including one or both of the first and second examples, the qualitative image artifact model is trained with a plurality of artifact-image label pairs, each artifact-image label pair including a respective image with an artifact and a label identifying the artifact. In a fourth example of the method, optionally including one or more or each of the first through third examples, at least some images included in the plurality of artifact-image label pairs are generated by introducing artifacts in the at least some images, the introduced artifacts introduced by adjusting one or more calibration vectors applied to generate the at least some images.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method for calibrating a medical imaging system, comprising:
    selecting one or more calibration vectors from a plurality of calibration vectors stored in a memory to be updated based on an artifact in an image acquired with the medical imaging system;
    generating a calibration protocol for a calibration scan to be carried out by the medical imaging system based on the selected one or more calibration vectors;
    performing, via the medical imaging system, the calibration scan according to the calibration protocol to obtain updated calibration data related to the selected one or more calibration vectors; and
    updating the selected one or more calibration vectors based on the updated calibration data.

2. The method of claim 1, wherein selecting the one or more calibration vectors to be updated based on the artifact in the image comprises entering the image as input to a qualitative image artifact identification model trained to output the identification of the one or more calibration vectors based on the image.

3. The method of claim 1, wherein selecting the one or more calibration vectors to be updated based on the artifact in the image comprises identifying the artifact in the image based on a qualitative or quantitative image analysis and obtaining the identification of the one or more calibration vectors from a lookup table based on the identified artifact.

4. The method of claim 1, wherein selecting the one or more calibration vectors to be updated based on the artifact in the image comprises identifying a list of possible calibration vectors to be updated based on the artifact and selecting the one or more calibration vectors from the list of possible calibration vectors based on an imaging protocol used to acquire the image.

5. The method of claim 1, wherein wherein obtaining the calibration data with the medical imaging system comprises controlling the medical imaging system to perform the calibration scan according to the calibration protocol.

6. The method of claim 5, wherein the calibration scan is performed only to obtain the calibration data for updating the selected one or more calibration vectors and not to obtain any other calibration data usable to update any other calibration vectors.

7. The method of claim 1, wherein updating the selected one or more calibration vectors comprises updating the selected one or more calibration vectors but not any additional calibration vectors uncorrelated with the artifact.

8. The method of claim 1, further comprising performing a medical scan of a patient with the medical imaging system to generate one or more medical images of the patient, the medical scan carried out using the updated selected one or more calibration vectors.

9. The method of claim 1, further comprising determining that the selected one or more calibration vectors include an independent calibration vector, and in response, selecting the calibration protocol for the calibration scan to be carried out with the medical imaging system to obtain the calibration data, wherein the calibration protocol is selected based on the independent calibration vector.

10. The method of claim 1, further comprising determining that the selected one or more calibration vectors include a dependent calibration vector that depends from one or more independent calibration vectors, and in response, selecting the calibration protocol for the calibration scan to be carried out with the medical imaging system to obtain the calibration data, wherein the calibration protocol is selected based on the one or more independent calibration vectors.

11. A system, comprising:
a medical imaging device for obtaining image data usable to generate one or more images;
a computing device operably coupled to the medical imaging device and storing instructions in memory executable by one or more processors to:
select one or more calibration vectors from a plurality of calibration vectors stored in the memory of the computing device to be updated based on an artifact in an image of the one or more images acquired with the medical imaging device;
generate a calibration protocol for a calibration scan to be performed by the medical imaging device based on the selected one or more calibration vectors;
perform, via the medical imaging device, the calibration scan according to the calibration protocol to obtained updated calibration data related to the selected one or more calibration vectors; and
update the one or more calibration vectors based on the updated calibration data.

12. The system of claim 11, wherein the memory stores a qualitative image artifact model trained to identify the one or more calibration vectors based on the artifact in the image.

13. The system of claim 12, wherein the qualitative image artifact model is trained with a plurality of artifact-image label pairs, each artifact-image label pair including a respective image with an artifact and a label identifying the artifact.

14. The system of claim 13, wherein at least some images included in the plurality of artifact-image label pairs are generated by introducing artifacts in the at least some images, the introduced artifacts introduced by adjusting one or more calibration vectors applied to generate the at least some images.

15. The system of claim 11, wherein the medical imaging device comprises a computed tomography imaging device.

16. A method for calibrating a medical imaging device, comprising:
scanning one or more objects to generate one or more digital images with a plurality of different artifacts;
processing the generated one or more digital images to correlate one or more first calibration vectors stored in a memory with a first artifact of the one or more digital images and to correlate one or more second calibration vectors stored in the memory with a second artifact of the one or more digital images;
generating one or more calibration protocols for one or more calibration scans to be performed by the medical imaging device based on the one or more first calibration vectors and the one or more second calibration vectors;
performing, via the medical imaging device, the one or more calibration scans according to the one or more calibration protocols to obtain updated calibration data related to the one or more first calibration vectors and the one or more second calibration vectors;
updating the one or more first calibration vectors and the one or more second calibration vectors based on the updated calibration data, but not a third calibration vector stored in the memory uncorrelated with the plurality of different artifacts of the one or more digital images.

17. The method of claim 16, wherein scanning the one or more objects to generate the one or more digital images comprises scanning one or more phantoms to generate one or more quality assurance images.

18. The method of claim 16, wherein processing the generated one or more digital images to correlate the one or more first calibration vectors with the first artifact and to correlate the one or more second calibration vectors with the second artifact comprises entering the one or more digital images as input to a qualitative image artifact identification model trained to identify the one or more first calibration vectors based on the first artifact and identify the one or more second calibration vectors based on the second artifact.

19. The method of claim 18, wherein the qualitative image artifact model is trained with a plurality of artifact-image label pairs, each artifact-image label pair including a respective image with an artifact and a label identifying the artifact.

20. The method of claim 19, wherein at least some images included in the plurality of artifact-image label pairs are generated by introducing artifacts in the at least some images, the introduced artifacts introduced by adjusting one or more calibration vectors applied to generate the at least some images.

* * * * *